(12) United States Patent
Edagawa et al.

(10) Patent No.: US 6,188,510 B1
(45) Date of Patent: Feb. 13, 2001

(54) OPTICAL AMPLIFYING TRANSMISSION SYSTEM AND OPTICAL AMPLIFYING REPEATER

(75) Inventors: Noboru Edagawa; Shu Yamamoto; Shigeyuki Akiba, all of Tokyo (JP)

(73) Assignee: KDD Corporation, Tokyo (JP)

(*) Notice: Under 35 U.S.C. 154(b), the term of this patent shall be extended for 0 days.

(21) Appl. No.: 09/248,399

(22) Filed: Feb. 10, 1999

(30) Foreign Application Priority Data

Feb. 20, 1998 (JP) .................................................. 10-038322

(51) Int. Cl.[7] ...................................................... H01S 3/00
(52) U.S. Cl. ............................................. 359/341; 359/160
(58) Field of Search .................................. 359/341, 160, 359/345

(56) References Cited

U.S. PATENT DOCUMENTS 5,343,320 * 8/1994 Anderson .............................. 359/160
5,801,878 * 9/1998 Bourret et al. ........................ 359/341

* cited by examiner

*Primary Examiner*—Mark Hellner
(74) *Attorney, Agent, or Firm*—Christie, Parker & Hale, LLP

(57) ABSTRACT

An optical amplifying transmission system comprising a first optical amplifying transmission line including a first optical amplifier, a second optical amplifying transmission line including a second optical amplifier, a pumping light generator for generating pumping lights to be supplied to said first and second amplifiers, the powers of the pumping lights being variable, and first and second terminal stations which connect respectively to both ends of said first and second optical amplifying transmission lines.

14 Claims, 4 Drawing Sheets

OPTICAL AMPLIFYING TRANSMISSION SYSTEM AND OPTICAL AMPLIFYING REPEATER

FIELD OF THE INVENTION

This invention is related to an optical amplifying transmission system and an optical amplifying repeater, and more specifically, to an optical amplifying transmission system in which the transmission capacity of two optical transmission lines is alterable and an optical amplifying repeater therefor.

BACK GROUND OF THE INVENTION

A main method for international communication, until quite recently, has been a telephone and the volume of communication traffic between two countries has been mutually the same in both transmission directions. Therefore, up and down lines of a transmission system are designed symmetrically, namely as the capacity of both directions becomes equivalent.

However, due to the spread of an internet, a phenomenon has been occurring in which the volume of communication traffic of both transmission directions is greatly one-sided (asymmetrical traffic). Furthermore, the volume of communication traffic or the degree of asymmetry is subject to change with the passage of time.

In that circumstances, an extremely uneconomic means has been usually employed in which a transmission system capable of realizing the estimated maximum transmission capacity of both up and down transmission lines is constructed in the first place and only part of the system is used at the beginning.

Therefore, a transmission line has been greatly expected whose transmission capacity can be set up or altered more flexibly.

SUMMARY OF THE INVENTION

A purpose of this invention is to provide an optical amplifying transmission system in which the transmission capacity of two transmission lines is alterable even after completion of its construction and an optical amplifying. repeater used for the optical amplifying transmission system.

According to the invention, pumping powers can be varied flexibly, which are applied to a first amplifier disposed on a first optical amplifying transmission line and a second optical amplifier disposed on a second optical amplifying transmission line. Consequently, the transmission capacities of the first and second optical amplifying transmission lines can be set asymmetrically and, thus, there is no need to prepare an excessive transmission capacity in advance.

Preferably, the power distribution rate of each pumping power for being supplied to the first and second optical amplifiers is variable. Accordingly, the transmission capacities of the first and second optical amplifying transmission lines is easily controlled to be asymmetrical and its controlling structure is also simply realized. Furthermore, it is easy to insert the controlling structure as an optical amplifying repeater into a submarine optical cable.

By providing a divider for dividing pumping power control command light transmitted to the first optical amplifying transmission line from a first terminal and a controller for controlling the powers of pumping lights supplied to the respective first and second amplifiers by a pumping light generator according to the pumping power control command light divided by the divider, the pumping powers to be supplied to the first and second optical amplifiers or the power distribution rate can be remote-controlled.

DESCRIPTION OF THE PREFERRED EMBODIMENTS

Embodiments of the invention are explained below in detail with reference to the drawings.

Figure 1:
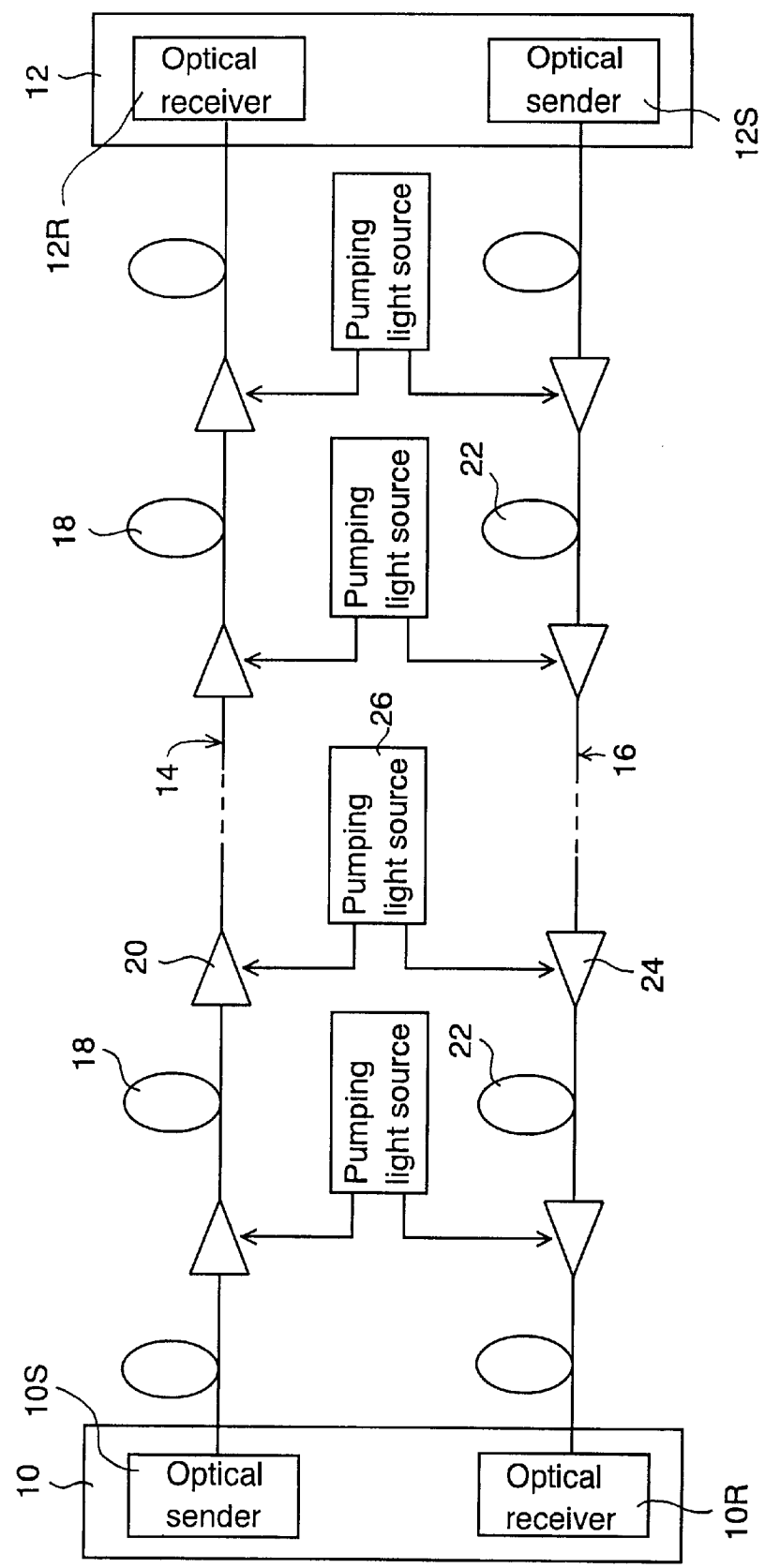
FIG. 1 is a schematic block diagram of an embodiment of the invention.

FIG. 1 is a schematic block diagram showing an embodiment of an optical amplifying transmission system of the invention. An up optical transmission line 14 for transmitting signal light from a terminal station 10 to a terminal station 12 and a down optical transmission line 16 for transmitting signal light from the terminal station 12 to the terminal station 10 are connected between the terminal stations 10 and 12. The terminal station 10 comprises an optical sender 10S for sending the signal light to the up optical transmission line 14 and an optical receiver 10R for receiving and processing the signal light input from the down optical transmission line 16. The terminal station 12 comprises an optical sender 12S for sending the signal light to the down optical transmission line 16 and an optical receiver 12R for receiving and processing the signal light input from the up optical transmission line 14.

The up optical transmission line 14 is an optical amplifying/repeating transmission line in which a plurality of transmission fibers 18 are connected through optical amplifiers 20. The down optical transmission line 16 is also an optical amplifying/repeating transmission line in which a plurality of transmission fibers 22 are connected through optical amplifiers 24.

Each of the optical amplifiers 20 and 24 comprises, for example, an erbium-doped optical amplifying fiber and a pumping light generator 26 generates pumping light for pumping the erbium-doped optical amplifying fibers. In a long distance optical transmission line system such as a submarine optical cable, the up optical transmission line 14 and the down optical transmission line 16 are kept in a single cable and the optical amplifiers 20 and 24 located within the same distance are stored in the same joint part. Each pumping light generator 26 supplies the pumping light to the optical amplifiers 20 and 24 stored in the same joint part.

The signal light output from the optical sender lOS of the terminal station 10 is optically amplified by the optical amplifier 20 while transmitting on the transmission optical fiber 18 of the up optical transmission line 14 and enters the optical receiver 12R of the terminal station 12. The signal light output from the optical sender 12S of the terminal station 12 is optically amplified by the optical amplifier 24 while transmitting on the transmission optical fiber 22 of the down optical transmission line 16 and enters the optical receiver 10R of the terminal station 10.

In the conventional art, the signal light level of the up optical transmission line 14 and that of the down optical transmission line 16 are designed to be exactly the same. That is, the pumping light having basically the same power is supplied to both of the optical amplifier 20 of the up optical transmission line 14 and the optical amplifier 24 of the down optical transmission line 16 so that both amplifiers operate in the same state. As a result, optical signal levels of the up and down transmission lines become approximately equivalent and the transmission capacity of the up and down transmission lines is also the same.

However, according to the invention, the pumping light generator 26 comprises a distributor, the details are described later, which is externally controllable of the power rates to be distributed to the amplifiers 20 and 24, and, therefore, the power of the pumping light supplied to the optical amplifier 20 and that of the pumping light supplied to the optical amplifier 24 can be varied freely. The pumping light generator 26, therefore, supplies the pumping light of more power to an optical amplifier (for example, the optical amplifier 20 or 24) requiring a greater transmission capacity and the pumping light of less power to an optical amplifier (for example, the optical amplifier 24 or 20) requiring less transmission capacity.

In an optical transmission system designed satisfactorily, the transmission capacity is almost determined by an optical signal level of an optical transmission line. Further, the optical signal level is proportional to the pumping light power supplied to an optical amplifier. Therefore, by altering the distribution rate of the pumping light power, the desirable transmission capacity can be distributed to the up optical transmission line 14 and the down optical transmission line 16 without changing the total transmission capacity of the up and down optical transmission lines 14 and 16.

If only the distribution rate is altered keeping the fixed total power of the pumping light generated from the pumping light generator 26, the feeding power to the pumping light generator 26, namely the feeding power to the repeating amplifier becomes regular and, as a result, there is no need to make an investment in equipment for an unnecessary transmission capacity.

As a whole transmission system, it is required that the optical senders 10S, 12S and the optical receivers 10R, 12R of the terminal stations 10 and 12 are capable of corresponding to the increase and decrease of the communication volume. However, in an international long distance communication system in which an optical submarine cable, which is difficult to be altered after construction, is employed as a part of transmission line, the utility value of the whole communication system remarkably increases since the form of utilization is extremely flexible as shown in the embodiment.

Figure 2:
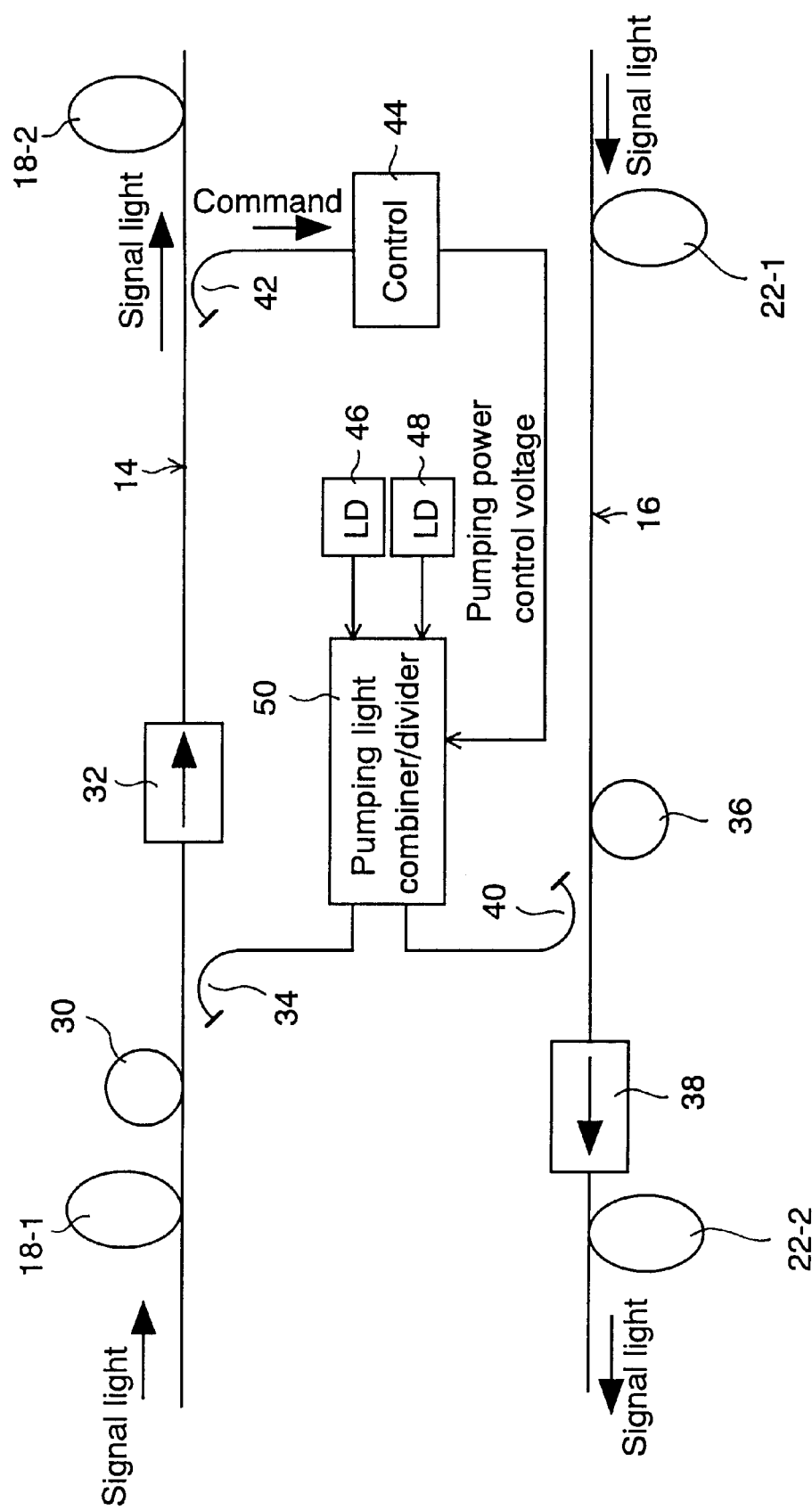
FIG. 2 is a schematic block diagram of an embodiment of an optical repeater.

FIG. 2 is a schematic block diagram of an embodiment of an optical amplifying repeater comprising the optical amplifiers 20 and 24, the pumping light generator 26 and their accompanying optical elements and circuits.

On the up optical transmission line 14, an erbium-doped optical amplifying fiber 30 and an optical isolator 32 are connected in series between a transmission optical fiber 18-1 on the upper course and a transmission optical fiber 18-2 on the lower course. The optical isolator 32 prevents Rayleigh scattering light from entering the optical amplifying fiber 30 from the transmission optical fiber 18-2 on the lower course. An WDM coupler 34 for introducing pumping light to the optical amplifying fiber 30 in the opposite direction from signal light is arranged between the optical amplifying fiber 30 and the optical isolator 32.

On the down optical transmission line 16, the structure is basically the same with that on the up optical transmission line 14. That is, an erbium-doped optical amplifying fiber 36 and an optical isolator 38 are connected in series between a transmission optical fiber 22-1 on the upper course and a transmission optical fiber 22-2 on the lower course. The optical isolator 38 prevents Rayleigh scattering light from entering the optical amplifying fiber 36 from the transmission optical fiber 22-2 on the lower course. A WDM coupler 40 for introducing pumping light to the optical amplifying fiber 36 in the opposite direction from signal light is arranged between the optical amplifying fiber 36 and the optical isolator 38.

Furthermore, on the up optical transmission line 14, a monitor coupler 42 for forwarding control command light sent from the terminal station 10 to a controller 44 is arranged between the optical isolator 32 and the transmission optical fiber 18-2. The control command light is used to control the distribution rate of the pumping light toward the optical amplifying fiber 30 on the up optical transmission line 14 and the pumping light toward the optical amplifying fiber 36 on the down optical transmission line 16. The signal light and the control command light transmitting on the up optical transmission line 14 enter the controller 44 through the monitor coupler 42, and the controller 44 detects the control command light and generates a distribution control voltage signal. If it is also desired to control the distribution rate from the terminal station 12, the same kind of monitor coupler is disposed between the optical isolator 38 and optical fiber 22-2 on the down optical transmission line 16 and output light of the monitor coupler is applied to the controller 44.

Laser diodes 46 and 48 generate laser light having a wavelength for pumping the erbium to be doped to the optical amplifying fibers 30, 36 and apply to a pumping light combiner/divider 50. The wavelengths of output light of the laser diodes 46 and 48 are slightly different each other, for example, approximately one nm or more, so as not to interfere mutually. The pumping light combiner/divider 50 combines the laser lights from the laser diodes 46, 48 and divides the combined light in two at a distribution rate according to the distribution control voltage signal from the controller 44. Each divided light is supplied to the optical amplifying fibers 30 and 36 through the WDM couplers 34 and 40 respectively.

The operation for distributing pumping light in the optical amplifying repeater shown in FIG. 2 is explained below. The signal light (containing the control command light for controlling the pumping light distribution rate) outputted from the optical transmitter lOS of the terminal station 10 transmits on the up optical transmission line 14 and enters the optical amplifying fiber 30 from the transmission optical fiber 18-1. As to be described later, pumping light from the WDM coupler 34 is introduced to the optical amplifying fiber 30 in the opposite direction from the signal light and the optical amplifying fiber 30 optically amplifies the signal light with the pumping light. The signal light optically amplified by the optical amplifying fiber 30 transmits the optical isolator 32 at low loss. The optical signal and the control command light output from the optical isolator 32 enter the controller 44 through the monitor coupler 42. The controller 44 detects the control command light from the input light. The output light of the optical isolator 32 also enters the next transmission optical fiber 18-2 and transmits toward the optical receiver 12R of the terminal station 12.

The controller 44 generates the distribution control voltage signal by photoelectric-converting the control command light from the monitor coupler 42 and applies it to a control input of the pumping light combiner/divider 50. The output laser lights of the laser diodes 46 and 48 enter to the two inputs of the pumping light combiner/divider 50. The pumping light combiner/divider 50 combines the two laser inputs and then divides into two portions at the distribution rate according to the distribution control voltage signal from the controller 44. The two portions of divided laser light are applied as pumping light to the optical amplifying fibers 30 and 36 through the WDM couplers 34 and 40 respectively.

As mentioned above, in the optical amplifying repeater shown in FIG. 2, the respective optical amplifying fibers 30 and 36 are pumped by the pumping light divided at the distribution rate determined by the distribution control voltage signal output from the controller 44. The gains of the optical amplifiers 20 and 24 at each repeating position of the transmission system shown in FIG. 1 are respectively controlled similarly on the up and down optical transmission lines 14 and 16. That is, signal levels on the up and down optical transmission lines 14 and 16 can be remote-controlled from the terminal station 10 (or 12).

Figure 3:
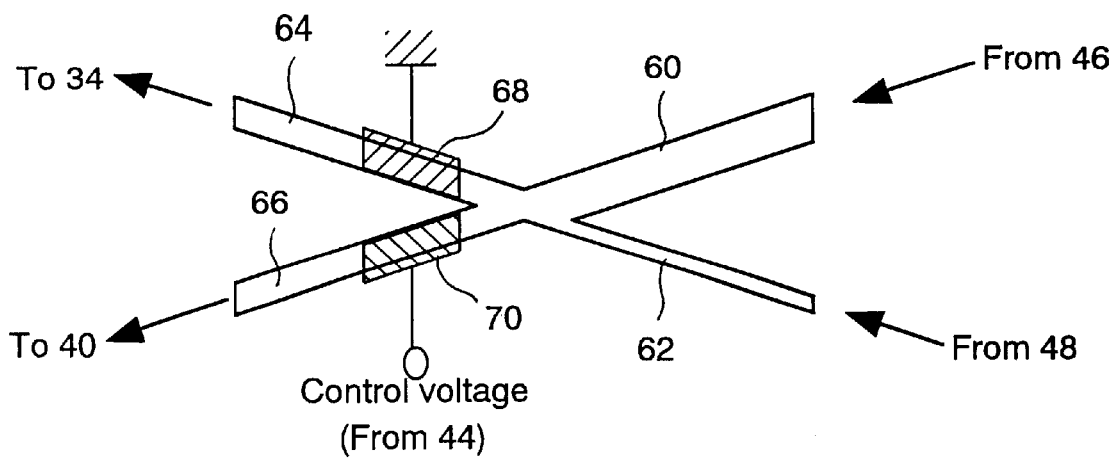
FIG. 3 is a plan view of an asymmetric X optical switch showing an illustration of a pumping light combiner/divider 50.

The pumping light combiner/divider 50 comprises, for example, an asymmetric X optical switch as shown in FIG. 3. FIG. 3 shows a plan view of the asymmetric X optical switch. The asymmetric X optical switch is formed, for example, as a waveguide on a crystal of lithium niobate. Two waveguides 60 and 62 on the input side of laser light and two waveguides 64 and 66 on the output side intersect at a point showing a shape of X. The output light of the laser diode 46 enters to the waveguide 60 and the output light of the laser diode 48 enters the waveguide 62. For stabilizing the distributing operation of the optical switch, the waveguide structures of the waveguides 60 and 62 are made to be different each other.

The laser lights input to the waveguides 60 and 62 are transmitted to the junction with the waveguides 64 and 66, combined there and distributed to the wavelengths 64 and 66. At the upper parts of the waveguides 64 and 66, electrodes 68 and 70 are respectively disposed. The electrode 68 is connected to the ground and, on the other hand, the control voltage from the controller 44 is applied to the electrode 70. Electric fields of mutually opposite directions are applied to the waveguides 64 and 66 to be located beneath the electrodes 68 and 70. With this operation, the applied voltage (the control voltage signal from the controller 44) of the electrode 70 can control the distribution rate for distributing the laser lights from the waveguides 60 and 62 to the waveguides 64 and 66. The laser lights transmitted the waveguides 64 and 66 are respectively applied to the WDM couplers 34 and 40. The laser lights from the laser diodes 46 and 48 is distributed equally to the waveguides 64 and 66 when no voltage is applied to the electrode 70.

Although the asymmetric X optical switch shown in FIG. 3 can realize the two functions of combining and dividing with the single optical element, it is also applicable to realize the two functions separately using different elements. For instance, a Y branch optical switch can be used for dividing wavelength-multiplexed pumping light or polarization-multiplexed pumping light at a desired distribution rate.

Figure 4:
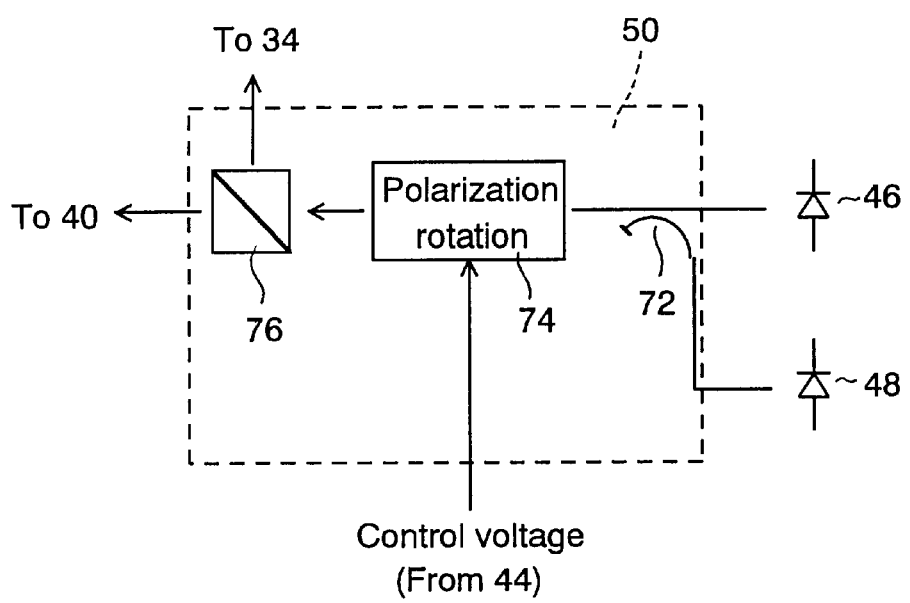
FIG. 4 is a schematic block diagram of another illustration of the pumping light combiner/divider 50.

FIG. 4 is a schematic block diagram showing another embodiment of the pumping light combiner/divider 50. The output light of the laser diodes 46 and 48 is multiplexed in the same polarization state by a WDM coupler 72 and applied to a polarization rotator 74. The polarization rotator 74 rotates a polarization plane of the input light according to the control voltage signal from the controller 44. Output light of the polarization rotator 74 is applied to a polarization beam splitter 76 and split into two elements of mutually orthogonal polarization planes. The light of one polarization plane is applied to the WDM coupler 34 and the light of the other polarization plane is applied to the WDM coupler 40.

As mentioned above, by using the polarization rotator 74 for rotating the polarization plane at an angle in accordance with the control voltage and the polarization beam splitter 76 together, the distribution rate, namely the rate of the pumping lights entering to the optical amplifying fibers 30 and 36 can be remote-controlled.

Figure 5:
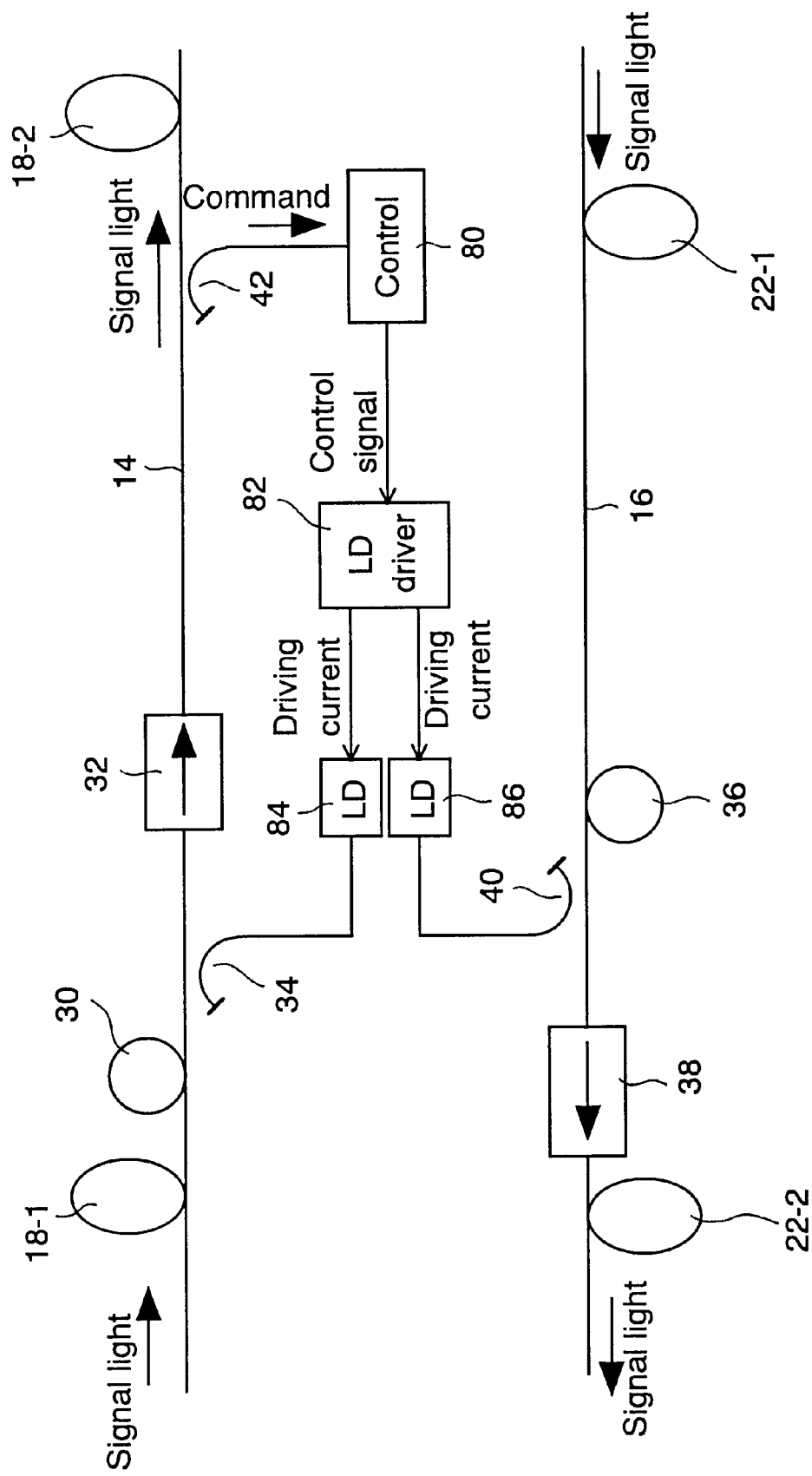
FIG. 5 is a schematic block diagram of another embodiment of the optical repeater.

The simpler structure is that output lights of individual laser diodes pump the optical amplifiers 30, 36 and the terminal station 10 (or 12) controls the driving currents of the laser diodes. FIG. 5 shows a schematic block diagram of this embodiment. Identical elements are labelled with reference numerals common to those in FIG. 1.

A controller 80 converts the control command light from the monitor coupler 42 into electric signal and applies the control signal showing the distribution of driving currents toward an LD driver 82. The LD driver 82 supplies the driving currents to the respective laser diodes 84 and 86 at the distribution rate in accordance with the control signal from the controller 80. That is, the LD driver 82 varies the distribution rate of driving currents to the laser diodes 84 and 86 according to the control signal from the controller 80 keeping a specific amount of feeding power. Generally, output of a laser diode is stabilized by an APC control and, therefore, its output power can be easily altered by changing a reference voltage of the APC circuit. The output laser lights of the laser diodes 84 and 86 are supplied to the optical amplifying fibers 30 and 36 through the WDM couplers 34, 40 and pump the optical amplifying fibers 30 and 36 respectively.

The structure shown in FIG. 5 also can vary the pumping light powers to be supplied to the up and down optical amplifying fibers 30 and 36 keeping the amount of feeding power for being supplied to the repeater and as a result the transmission capacity of the up and down lines can be made asymmetry.

Although the two laser diodes are employed in the above-mentioned embodiment, this invention is naturally applicable to the structures of using more than two laser diodes.

As readily understandable from the above description, according to the invention, it is possible to easily provide an economical optical transmission system to meet the needs of asymmetric communication traffic. That is, it is no longer necessary to construct an optical transmission line having an excessive transmission capacity.

While the invention has been described with reference to the specific embodiment, it will be apparent to those skilled in the art that various changes and modifications can be made to the specific embodiment without departing from the spirit and scope of the invention as defined in the claims.

What is claimed is:

1. An optical amplifying transmission system for changeable ratio of transmission comprising:
    a first optical amplifying transmission line including a first optical amplifier;
    a second optical amplifying transmission line including a second optical amplifier;
    a pumping light generator for generating pumping lights to be supplied to said first and second amplifiers, at least one of the pumping lights being variable;
    first and second terminal stations which connect respectively to both ends of said first and second optical amplifying transmission lines;

a divider for dividing pumping Power control command light propagating on said first optical amplifying transmission line; and a controller for controlling power ratio of the pumping lights that are supplied to said first and second optical amplifiers from said pumping light generator in accordance with pumping power control command light divided by said divider.

2. The optical amplifying transmission system of claim 1, further comprising:

a divider for dividing pumping power control command light introduced to said first optical amplifying transmission line from said first terminal station; and a controller for controlling said variable power of said at least one of said first and second pumping lights in accordance with the pumping power control command light divided by said divider.

3. The optical amplifying transmission system of claim 1 wherein said controller controls a power level of the pumping light which is supplied to each of said first and second amplifiers by said pumping light generator in accordance with said pumping power control command light.

4. The optical amplifying transmission system of claim 1 wherein said pumping light generator comprises a pumping light source for generating pumping light and a divider for dividing the pumping light generated by said pumping light source into two at a specified power distribution rate.

5. The optical amplifying transmission system of claim 4 wherein said pumping light source comprises a plurality of laser elements for generating laser light, and a combiner for combining outputs of said plurality of laser elements.

6. The optical amplifying transmission system of claim 4 wherein said divider comprises a polarization rotator for rotating a polarization of the output light of said pumping light source at a specified angle and a polarization divider for dividing output light of said polarization rotator at two orthogonal polarization directions.

7. The optical amplifying transmission system of claim 1 wherein said pumping light generator comprises two laser elements for generating laser light and an asymmetric X optical switch for combining output light of said laser elements and dividing the combined light into two at a specified power distribution rate.

8. An optical amplifying repeater comprising:

a first optical amplifier to be disposed on a first optical transmission line;

a second optical amplifier to be disposed on a second optical transmission line;

a pumping light generator for generating pumping light to be supplied to said first and second optical amplifiers; and a controller for controlling power ratio of pumping lights that are supplied to said first and second optical amplifiers from said pumping light generator in accordance with an external pumping power control command.

9. The optical amplifying repeater of claim 8 further comprising a divider for dividing pumping power control command light from said first optical transmission line and supplying it to said controller as the pumping power control command.

10. The optical amplifying repeater of claim 8 wherein said controller controls the power level of the pumping light that is supplied to each of said first and second optical amplifiers from said pumping light generator in accordance with said pumping power control command.

11. The optical amplifying repeater of claim 8 wherein said pumping light generator comprises a pumping light source for generating pumping light and a divider for dividing the pumping light generated by said pumping light source into two at a specified power distribution rate.

12. The optical amplifying repeater of claim 8 wherein said pumping light generator comprises a plurality of laser elements for generating laser light, a combiner for combining output light of said plurality of laser elements and a divider for dividing output light of said combiner into two at a specified power distribution rate.

13. The optical amplifying repeater of claim 12 wherein said divider comprises a polarization rotator for rotating a polarization of output light of said pumping light source at a specified angle and a polarization divider for dividing output light of said polarization rotator at two orthogonal polarization directions.

14. The optical amplifying repeater of claim 8 wherein said pumping light generator comprises two laser elements for generating laser light and an asymmetric X optical switch for combining output light of said laser elements and dividing the combined light into two at a specified power distribution rate.

* * * * *